(12) United States Patent
Lane

(10) Patent No.: US 6,205,827 B1
(45) Date of Patent: Mar. 27, 2001

(54) REGULATOR TORQUE ISOLATION SYSTEM AND METHOD

(75) Inventor: James N. Lane, Rio Rancho, NM (US)

(73) Assignee: Safety Valve Systems, LLC, Carson City, NV (US)

( * ) Notice: Subject to any disclaimer, the term of this patent is extended or adjusted under 35 U.S.C. 154(b) by 0 days.

(21) Appl. No.: 09/348,999

(22) Filed: Jul. 7, 1999

(51) Int. Cl.[7] .................................................. F16K 35/10
(52) U.S. Cl. .................. 70/180; 70/189; 70/218; 70/223; 70/422; 137/385; 192/69.81; 192/114 R
(58) Field of Search ........................... 70/175–180, 188, 70/189, 218, 223, 231, 422; 137/383, 385; 192/69.81, 114 R, 43, 46, 89.27; 251/213

(56) References Cited

U.S. PATENT DOCUMENTS

| | | | |
|---|---|---|---|
| 617,648 | * 1/1899 | Fergusson et al. | 70/221 |
| 1,037,601 | * 9/1912 | Davis | 70/218 |
| 1,545,712 | 7/1925 | Toy . | |
| 1,729,505 | * 9/1929 | Darby | 70/218 |
| 4,026,397 | * 5/1977 | Raus | 192/114 R X |
| 4,073,168 | * 2/1978 | Takada | 70/218 X |
| 4,624,445 | 11/1986 | Putnam | 251/63.4 |
| 4,696,320 | 9/1987 | Bull | 137/116.5 |
| 4,762,144 | 8/1988 | Ford | 137/382.5 |
| 4,848,724 | 7/1989 | Pettinaroli | 251/95 |
| 4,881,388 | 11/1989 | Pruim | 70/175 |
| 5,039,062 | 8/1991 | England et al. | 251/95 |
| 5,188,335 | 2/1993 | Pettinaroli | 251/95 |
| 5,214,982 | * 6/1993 | Shieh | 74/575 |
| 5,365,759 | 11/1994 | Bonomi | 70/177 |
| 5,492,145 | 2/1996 | Stowers | 137/218 |
| 5,664,447 | 9/1997 | Neeley | 70/175 |
| 5,727,590 | 3/1998 | Julicher et al. | 137/296 |
| 6,070,442 | * 6/2000 | Neeley et al. | 70/178 X |

FOREIGN PATENT DOCUMENTS

| | | | |
|---|---|---|---|
| 27877 | * 6/1921 | (DK) | 70/218 |
| 288323 | * 10/1928 | (GB) | 70/231 |

* cited by examiner

Primary Examiner—Lloyd A. Gall
(74) Attorney, Agent, or Firm—Schmeiser, Olsen & Watts

(57) ABSTRACT

A torque isolation system includes a handle and a torque isolator that is moveable between a first position, wherein the torque isolator transmits either of two possible directions of torque from the handle to a rotatable regulator stem, and a second position, wherein the torque isolator transmits only one or neither of the two possible directions of torque from the handle to the regulator stem. The torque isolation system also includes a lock securing the torque isolator in a selected position. The second position may be either a decoupled position, wherein the torque isolator transmits neither of the two possible directions of torque from the handle to the regulator stem, or a ratchet position, wherein the torque isolator does not transmit a first direction of torque from the handle to the regulator stem, but the torque isolator does transmit a second direction of torque from the handle to the regulator stem. A method of decoupling a handle from a rotatable regulator stem includes moving a torque isolator from a first position, wherein the torque isolator transmits either of two possible directions of torque from the handle to a rotatable regulator stem, to a second position, wherein the torque isolator transmits only one or neither of the two possible directions of torque from the handle to the regulator stem. The method also includes locking the torque isolator in the second position.

8 Claims, 7 Drawing Sheets

REGULATOR TORQUE ISOLATION SYSTEM AND METHOD

BACKGROUND OF THE INVENTION

1. Technical Field

This invention generally relates to regulators, and more specifically relates to a torque isolation system for use in regulators.

2. Background Art

Tagout procedures for valves and other types of regulators are required when an individual must leave a valve or regulator, but the valve or regulator must remain open, closed, or partially open for safety reasons. The procedures require the individual to leave a "tag" on the regulator indicating that others should not tamper with the regulator in the individual's absence. Tags must be attached to the regulator in a conspicuous manner so that others will recognize the tag and avoid tampering with the valve or regulator.

In lockout-tagout procedures, a user locks the regulator in a set position to prevent its actuation, and places a tag on it as in tagout procedures. Although tagout procedures are usually effective, lockout-tagout procedures provide additional safety by preventing actuation of the regulator. Moreover, OSHA regulations do not require training of employees to be as extensive for lockout-tagout procedures as for tagout procedures alone. By using lockout-tagout procedures rather than tagout procedures alone, employers can avoid the costs and disruptions to normal business that result from extensive training requirements.

Prior lockout devices have not been convenient to use. One example of such a device is a shell that covers the regulator handle. By covering the handle, the shell prevents actuation of the regulator. Accordingly, if the regulator is partially open, the shell will prevent it from being further opened or further closed. Such a shell does not allow the regulator to be closed, while preventing it from being opened at the same time. Also, the shell cannot be used on regulators that are in tight spaces, such as regulators used in the microelectronics industry, or on regulators with large handles.

Other valves have lockout devices, such as those described in U.S. Pat. No. 4,881,388 to Pruim and U.S. Pat. No. 1,545,712 to Toy, that are locked and unlocked using a single key. Such lockout devices are not useful in lockout-tagout procedures. In lockout-tagout procedures the user who locks the regulator should be the only one who can unlock the regulator. If all users have the same key, then any user can unlock the regulator.

DISCLOSURE OF INVENTION

Accordingly, it is desirable to have a regulator lockout system that may be fitted on a variety of different regulators and that each user can use to lock the regulator and prevent other users from unlocking it.

Sometimes it is desirable to allow others to move a valve or regulator in one direction, but not the other. For example, an individual may leave a valve partially open, and safety concerns may require that the valve not be opened farther, but safety concerns may also dictate that others should be able to close the valve if the need arises. Tagout procedures would provide that in such a situation a different tag should be left on the valve, indicating the valve may be closed, but may not be opened farther. Accordingly, it may be desirable to have a lockout system that is capable of preventing actuation of a regulator in one direction, but allowing actuation of the regulator in the other direction.

According to the present invention, a torque isolation system includes a torque isolator that is moveable between a first position, wherein the torque isolator transmits either of two possible directions of torque from a handle to a rotatable regulator stem, and a second position, wherein the torque isolator transmits only one or neither of the two possible directions of torque from the handle to the regulator stem. The torque isolation system also includes a lock that secures the torque isolator in a selected position. The second position may be a decoupled position wherein the torque isolator transmits neither of the two possible directions of torque from the handle to the regulator stem. However, the second position may be a ratchet position, wherein the torque isolator does not transmit a first direction of torque from the handle to the regulator stem, but the torque isolator does transmit a second direction of torque from the handle to the regulator stem.

In one embodiment, the torque isolator is moveable between the coupled position wherein the torque isolator is coupled to the handle, the decoupled position wherein the torque isolator is decoupled from the handle, and the ratchet position wherein the torque isolator is decoupled from the handle if the handle is rotated in a first direction, but the torque isolator is coupled to the handle if the handle is rotated in a second direction. The torque isolation system may also include a stem adapter coupled to the torque isolator, such that the stem adapter transmits either of two possible directions of torque from the torque isolator to the regulator stem. Moreover, the torque isolation system may include a bias member that biases the torque isolator into the coupled position and a lock opposing the biasing of the bias member.

The invention also includes a method of decoupling a handle from a rotatable regulator stem, which includes moving a torque isolator from a first position, wherein the torque isolator transmits either of two possible directions of torque from the handle to a rotatable regulator stem, to a second position, wherein the torque isolator transmits only one or neither of the two possible directions of torque from the handle to the regulator stem. The method also includes locking the torque isolator in the second position.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements.

BEST MODES FOR CARRYING OUT THE INVENTION

Figure 1:
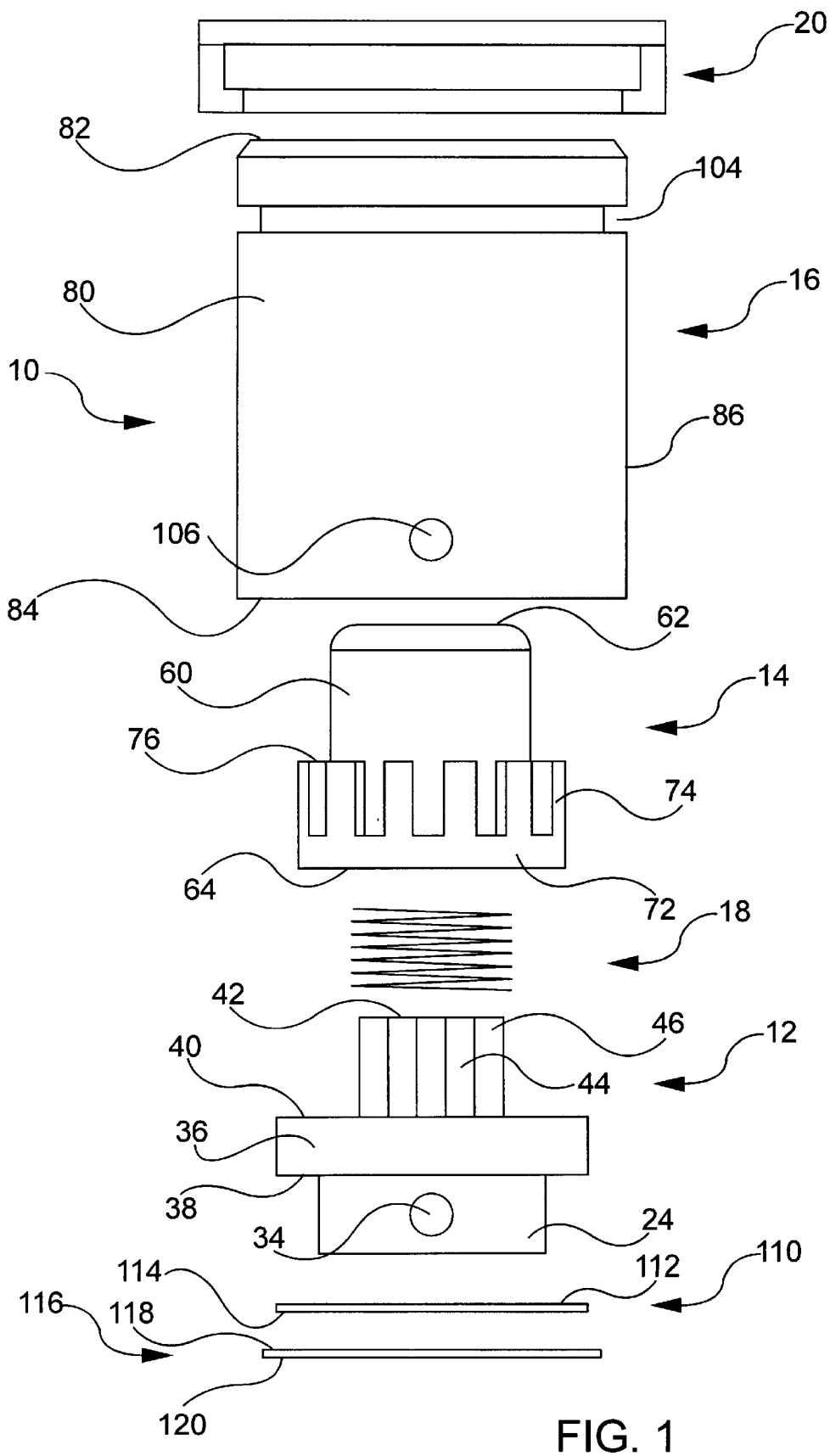
FIG. 1 is an exploded side plan view of a torque isolation system according to the present invention.
Figure 9:
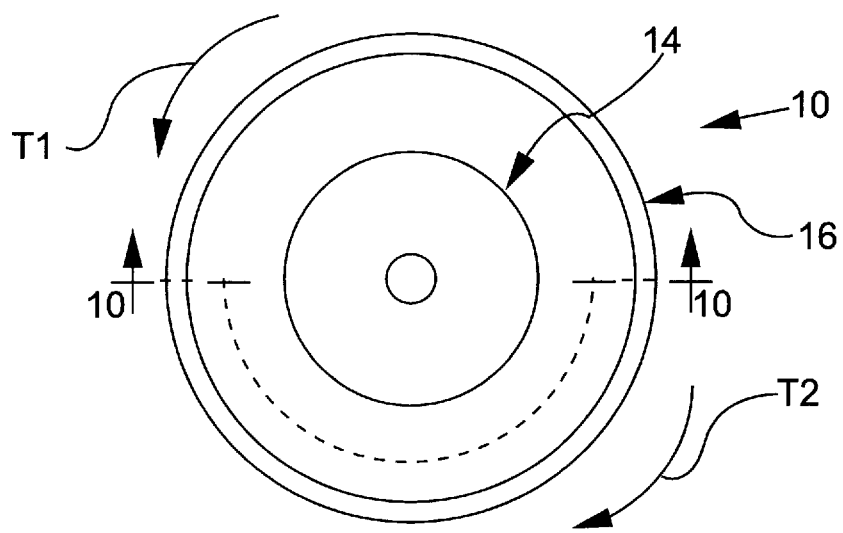
FIG. 9 is a top plan view of the torque isolation system of FIG. 1.

Referring to FIG. 1, a torque isolation system 10 according to the present invention preferably includes a stem adapter 12 that is coupled to a regulator stem (i.e., a torque applied to one is transmitted to the other), such as a valve stem. The regulator stem rotates to actuate a regulator (not shown). Stem adapter 12 is coupled to a torque isolator 14, which is releasably coupled to a handle 16. Torque isolator 14 is preferably moveable between a coupled position, wherein torque isolator 14 is coupled to handle 16, a decoupled position wherein torque isolator 14 is decoupled from handle 16, and a ratchet position wherein torque isolator 14 is decoupled from handle 16 if the handle 16 is rotated in a first direction T1 (see FIG. 9), but torque isolator 14 is coupled to handle 16 if handle 16 is rotated in a second direction T2 (see FIG. 9). A bias member, or spring 18 biases torque isolator 14 into the coupled position, and a lock 20 opposes spring 18.

Figure 2:
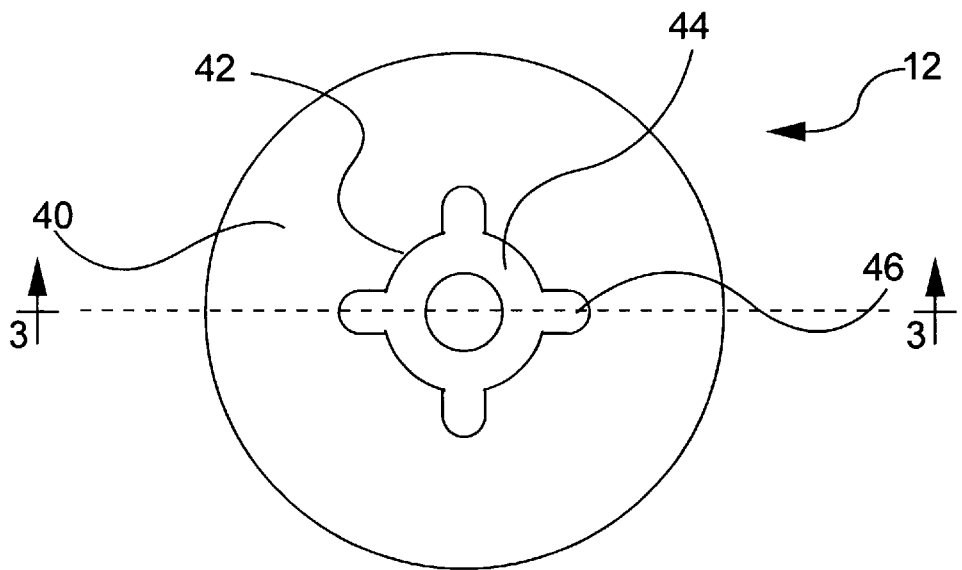
FIG. 2 is a top plan view of a stem adapter according to the present invention.
Figure 3:
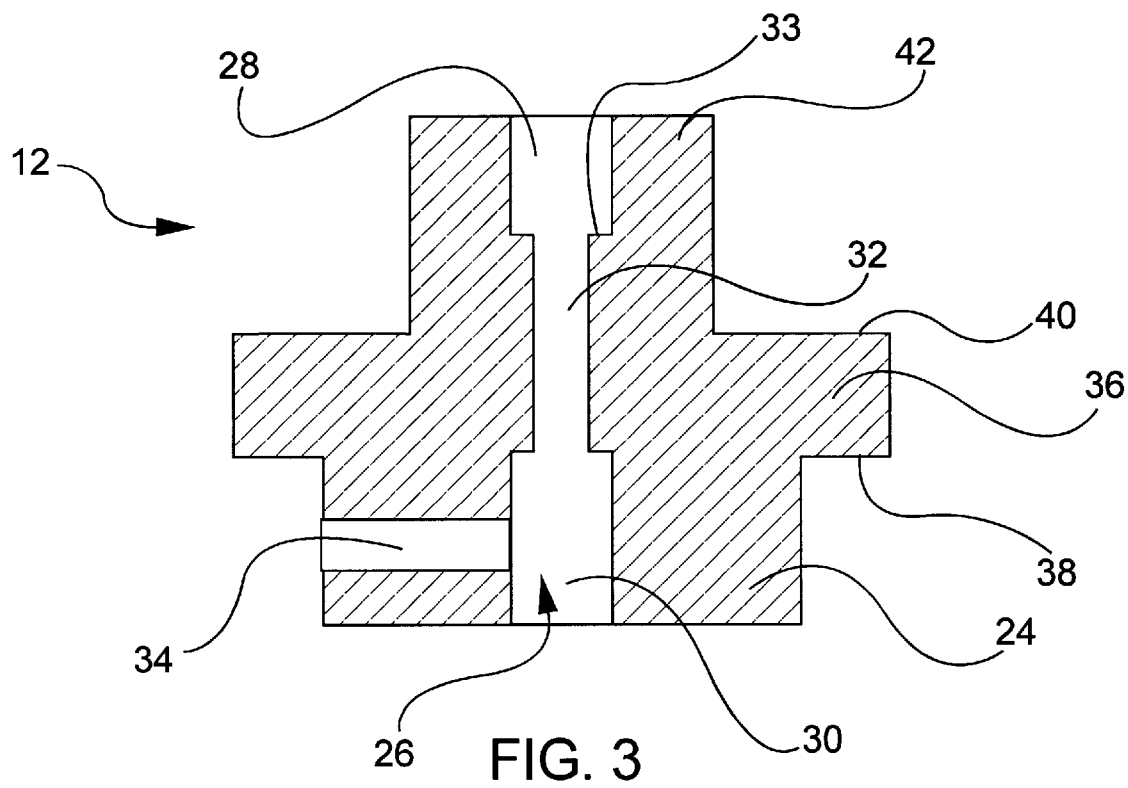
FIG. 3 is a cross-sectional view taken along line 3—3 of FIG. 2.

Referring to FIGS. 1–3, stem adapter 12 includes a cylindrical shoulder 24 that defines an aperture 26 (see FIG. 3). Aperture 26 receives a regulator stem (not shown). Preferably, aperture 26 is a hole extending through stem adapter 12, having a top portion 28, a bottom portion 30, and an intermediate portion 32. Intermediate portion 32 has a smaller diameter than top portion 28 so that an upwardly facing annular surface 33 is formed between top portion 28 and intermediate portion 32. Bottom portion 30 is adapted to receive and engage the stem, so the shape of bottom portion 30 will differ depending on the shape of the stem to which the torque isolation system 10 will be attached. A threaded hole 34 extends radially outwardly from aperture 26. Depending on the type of stem to which torque isolation system 10 is attached, either threaded hole 34 receives a screw or a bolt, which extends into aperture 26 and secures stem adapter 12 to the regulator stem, or aperture 32 receives a screw or bolt, wherein the head of the screw or bolt abuts annular surface 33 and the screw or bolt extends downwardly, engaging threads in the stem. Those skilled in the art will appreciate that stem adapter 12 may also be secured to the regulator stem in some other manner.

A flange 36 extends radially outwardly from the top of shoulder 24. Flange 36 has a bottom surface 38 facing toward shoulder 24 and an opposing top surface 40. A protrusion 42 extends axially upwardly from top surface 40 of flange 36. Protrusion 42 has at least one engaging surface. Preferably, protrusion 42 includes a cylinder 44 having circumferentially spaced engaging members 46, which provides multiple engaging surfaces extending radially outwardly from cylinder 44. In the embodiment shown in FIGS. 1–3, protrusion 42 includes four engaging elements extending outwardly from cylinder 44 at right angles to each other.

Figure 4:
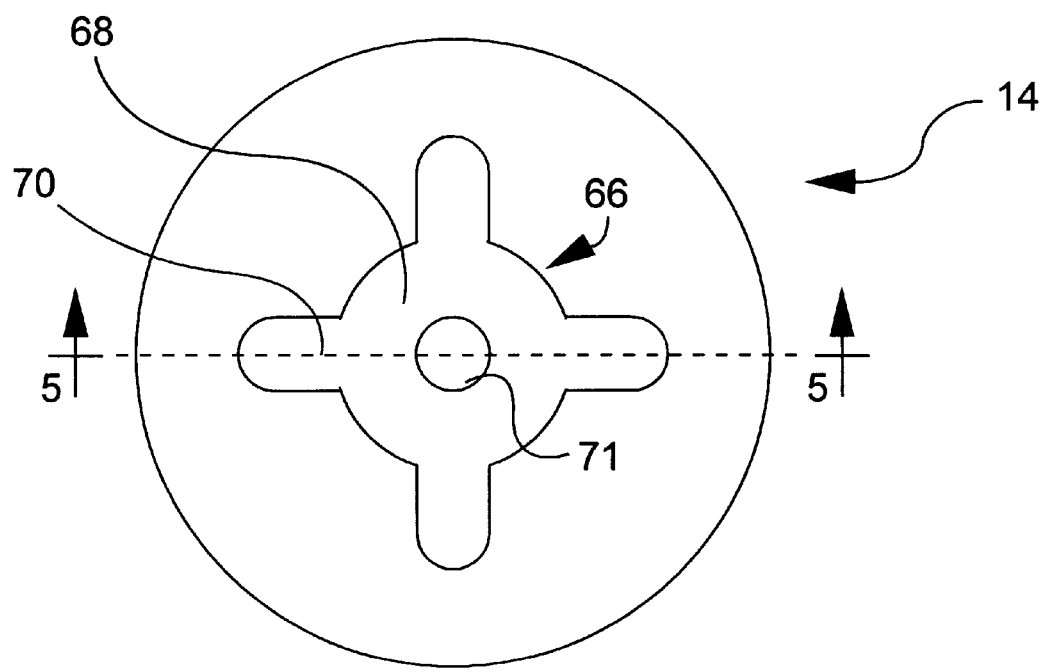
FIG. 4 is a bottom plan view of a torque isolator according to the present invention.
Figure 5:
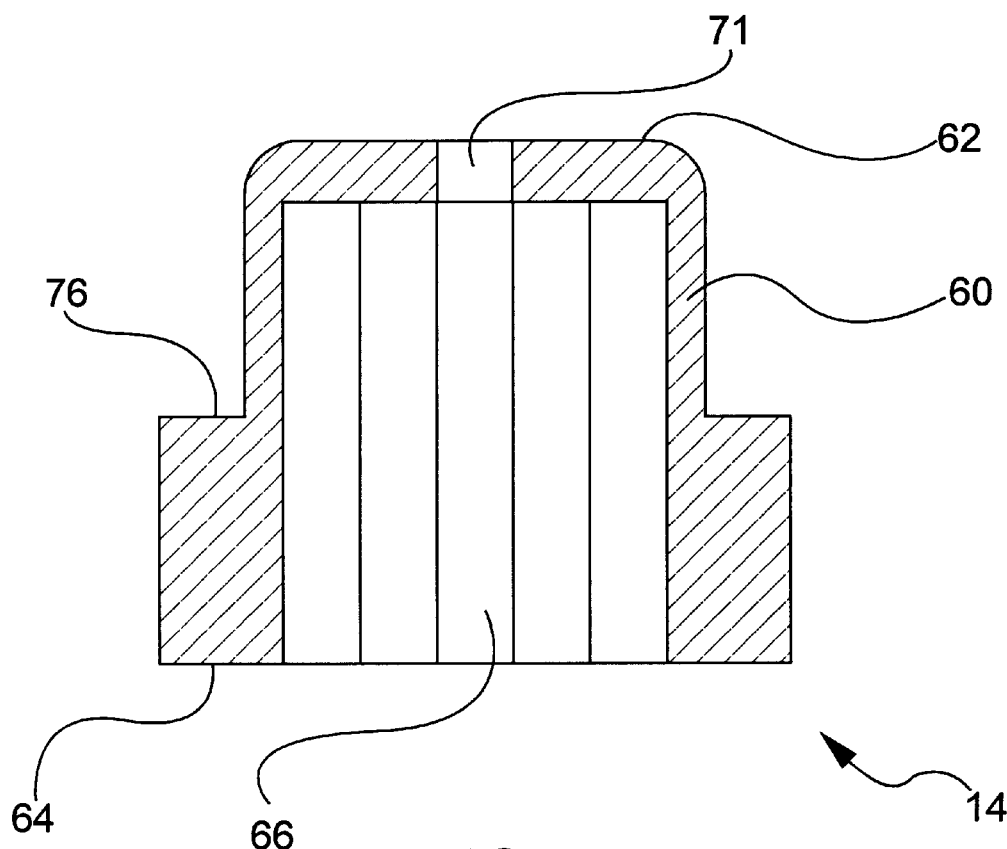
FIG. 5 is a cross-sectional view taken along line 5—5 of FIG. 4.

Referring now to FIG. 1 and FIGS. 4–5, torque isolator 14 includes a cylindrical body 60 with a top surface 62 and a bottom surface 64. A centrally located aperture 66 extends upwardly from bottom surface 64. Aperture 66 is adapted to receive and engage protrusion 42 of stem adapter 12. Accordingly, aperture 66 preferably includes an inner cylinder 68 for receiving cylinder 44 and circumferentially spaced recesses 70 extending radially outwardly from cylinder 44 for receiving engaging members 46. Thus, protrusion 42 of stem adapter 12 extends into and engages aperture 66 of torque isolator 14, thereby coupling stem adapter 12 to torque isolator 14 and coupling torque isolator 14 to the regulator stem. An axial hole 71 extends upwardly from aperture 66 and through top surface 62 of torque isolator 14. Preferably, torque isolator 14 also includes an annular flange 72 extending outwardly from the bottom of cylindrical body 60. Circumferentially spaced engaging members 74 extend radially outwardly from cylindrical body 60, and extend axially upwardly from flange 72. Engaging members 74 have upwardly facing surfaces 76 that may extend in a horizontal direction (shown) or that may be sloped in a spiral direction (not shown).

Alternatively, stem adapter 12 may be omitted and aperture 66 of torque isolator 14 may be adapted to directly receive and engage the regulator stem. Thus, torque isolator 14 can, be secured directly to the regulator stem. Torque isolator 14 may include a stem position indicator on top surface 62, such as a groove or mark extending radially across top surface 62, that indicates whether the regulator stem is in an open position or a closed position.

Referring to FIG. 1, spring 18 is preferably a compression spring that is seated around protrusion 42 of stem adapter 12 or, in the alternative, around the regulator stem, and that abuts bottom surface 64 of torque isolator 14, so that it biases torque isolator 14 upwardly from stem adapter 12.

Figure 6:
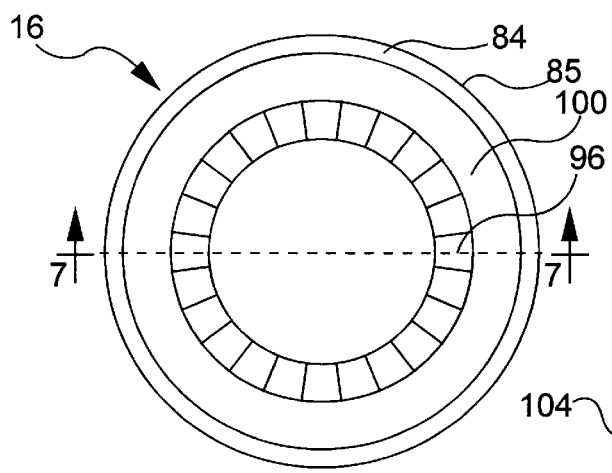
FIG. 6 is a bottom plan view of a handle according to the present invention.
Figure 7:
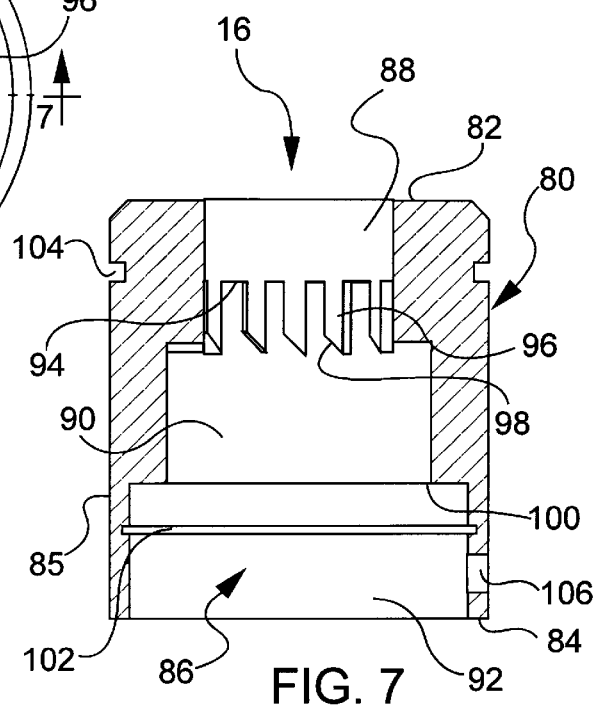
FIG. 7 is a cross-sectional view taken along line 7—7 of FIG. 6.

Referring now to FIG. 1 and FIGS. 6–7, handle 16 includes a cylindrical body 80 with a top surface 82, a bottom surface 84 and an outwardly-facing cylindrical surface 85. Body 80 defines an axially extending hole 86 that includes a top portion 88, an intermediate portion 90, and a bottom portion 92. Top portion 88 extends axially downwardly from top surface 82 and has a diameter that is slightly larger than the outer diameter of cylindrical body 60 of torque isolator 14.

Intermediate portion 90 has a diameter that is slightly larger than the outer diameter of flange 72 of torque isolator 14 and that is larger than the diameter of top portion 88. Intermediate portion 90 extends downwardly from top portion 88, forming a downwardly facing annular surface 94 between intermediate portion 90 and top portion 88. Circumferentially spaced engaging members 96 extend axially downwardly from annular surface 94 and extend radially into intermediate portion 90 of hole 86. The bottom portion of each engaging member 96 preferably includes a sloped surface 98 that extends in a spiral direction. Engaging members 96 are adapted to interlock with engaging members 74 of torque isolator 14.

Bottom portion 92 has a diameter that is slightly larger than the outer diameter of flange 36 of stem adapter 12, and that is larger than the diameter of the intermediate portion 90. Bottom portion 92 extends downwardly from intermediate portion 90, forming a downwardly facing annular surface 100 between intermediate portion 90 and bottom portion 92. Handle 16 defines an annular groove 102 that extends radially outwardly from bottom portion 92 intermediate annular surface 100 and bottom surface 84. Handle 16 also defines an annular groove 104 that extends radially inwardly from cylindrical surface 85 proximal top surface 82. A hole 106 extends radially through body 80 of handle 16 intermediate bottom surface 84 and annular groove 102.

Flange 36 of stem adapter 12 is seated within bottom portion 92 of hole 86 in handle 16. Top surface 40 of flange 36 abuts annular surface 100 and protrusion 42 extends upwardly into aperture 66 of torque isolator 14, so that stem adapter 12 is coupled to torque isolator 14. A washer 110 has a top surface 112 and a bottom surface 114. Top surface 112 of washer 110 abuts bottom surface 38 of flange 36 on stem adapter 12.

A snap ring 116 has a top surface 118 and a bottom surface 120. Snap ring 116 engages annular groove 102 and top surface 118 abuts bottom surface 114 of washer 110. Accordingly, stem adapter 12 is connected to handle 16 by snap ring 116, washer 110, and annular surface 94 (see FIGS. 10–12).

Spring 18 is preferably a compression spring that abuts top surface 40 of flange 36 on stem adapter 12 and bottom surface 64 of torque isolator 14. Thus, spring 18 biases torque isolator 14 upwardly away from stem adapter 12 and into engagement with handle 16 (see FIG. 10).

Figure 8:
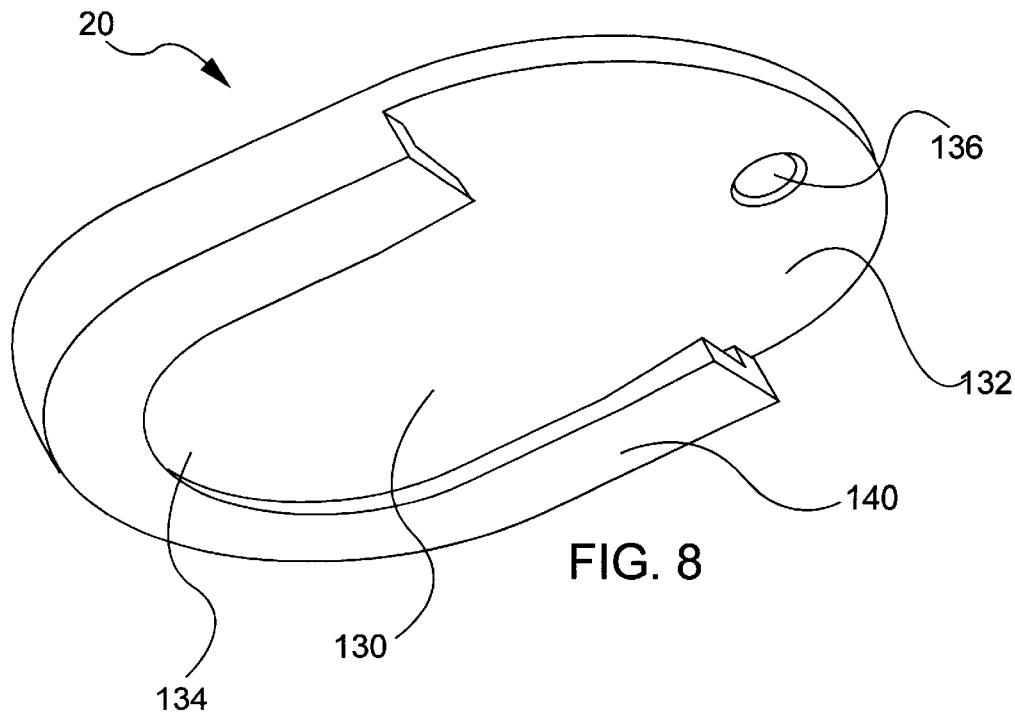
FIG. 8 is a perspective view of a lock according to the present invention.

Referring now to FIG. 8, slide lock 20 includes a plate 130 having a first end 132 that is preferably semi-circular, and an opposing second end 134 that is also preferably semi-circular. However, the ends may be some other shape. Plate 130 defines a hole 136 proximal to first end 132 for receiving a padlock 138 or some other type of locking mechanism (see FIGS. 11–12).

The edge of second end 134 and opposing edges of plate 130 intermediate first end 132 and second end 134 extend downwardly and inwardly to form a continuous engaging member 140. Engaging member 140 has an engaging surface for engaging annular groove 104 in handle 16. Preferably, engaging member 140 engages annular groove 104, and plate 130 extends over top surface 82 of handle 16, abutting top surface 62 of torque isolator 14 and opposing the biasing of spring 18. Thus, lock 20 secures torque isolator 14 in a selected position. Lock 20 may also receive a padlock 138 (see FIGS. 11–12) to prevent disengagement of lock 20 from handle 16.

Lock 20 may receive a multi-user hasp, which is adapted to receive multiple padlocks and remain locked until all padlocks have been removed. The multi-user hasp is desirable if several individuals will be in a hazardous area, requiring torque isolation system 10 to be locked. If all the individuals place their locks on the multi-user hasp, then the torque isolation system 10 will remain locked until all users have exited the hazardous area and removed their padlocks.

Figure 10:
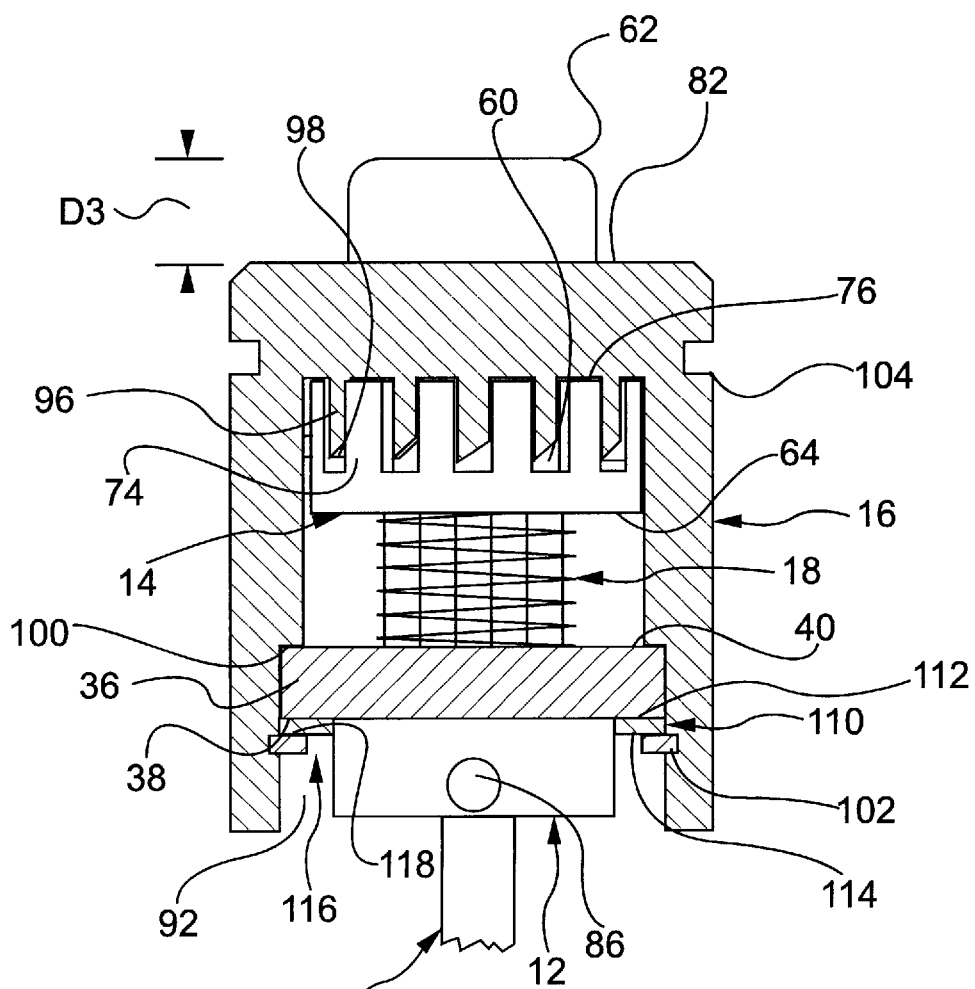
FIG. 10 is a cross-sectional view taken along line 10—10 of FIG. 9 with the torque isolator in the coupled position.
Figure 11:
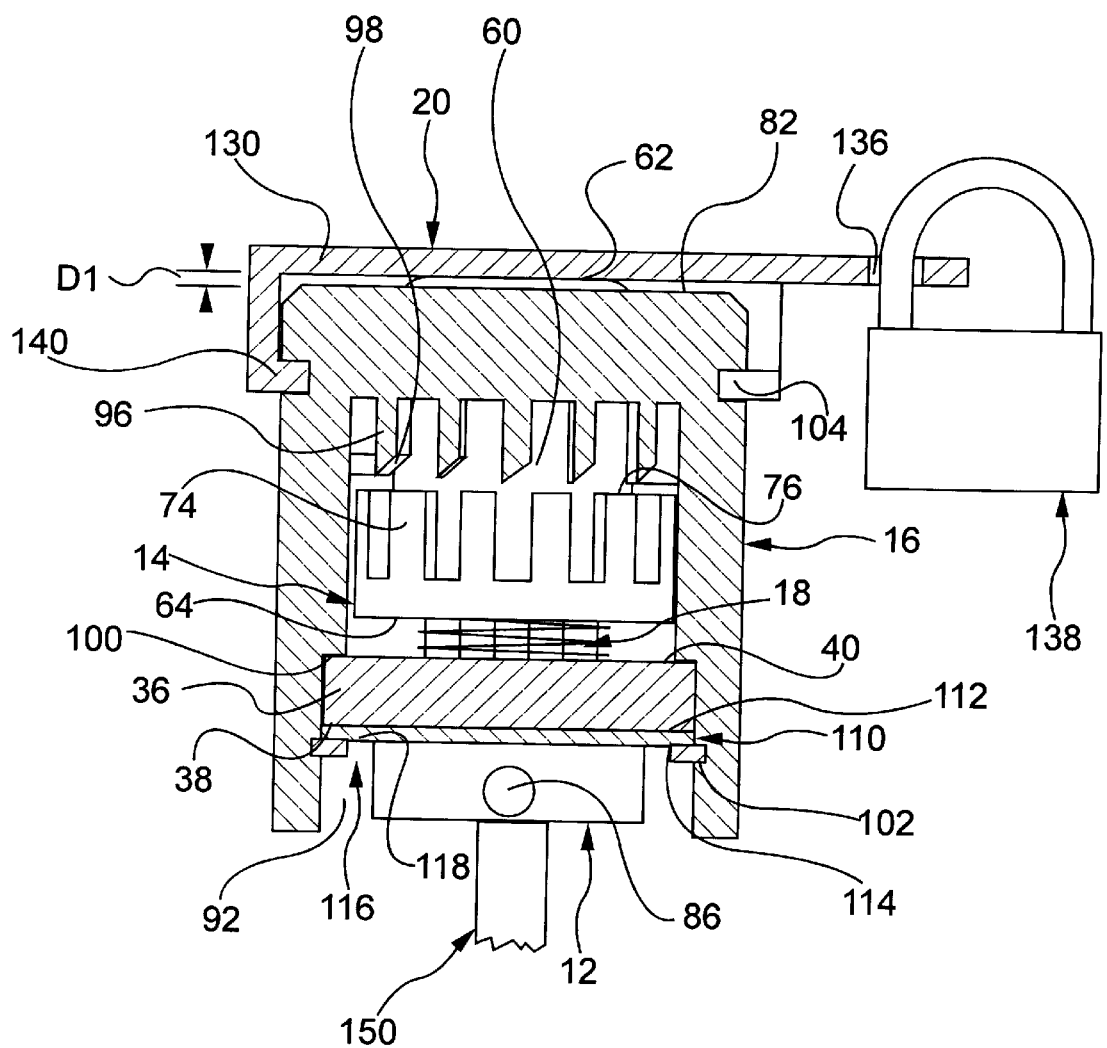
FIG. 11 is a cross-sectional view similar to FIG. 10, but with the torque isolator in the decoupled position, and with the lock securing the torque isolator in the decoupled position.
Figure 12:
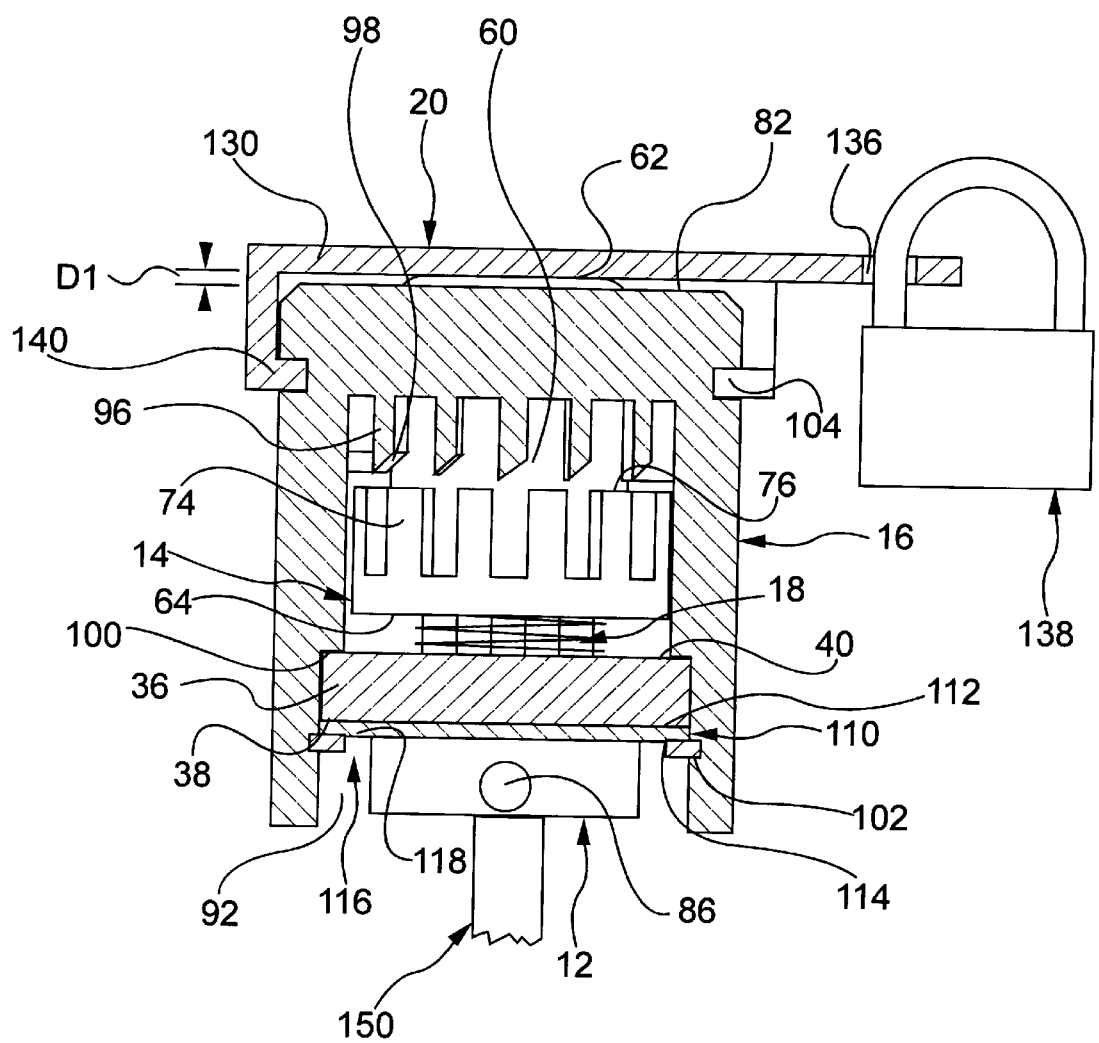
FIG. 12 is a cross-sectional view similar to FIG. 11, but with the torque isolator in the ratchet position.

Referring to FIGS. 10–12, in assembling torque isolation system 10, torque isolator 14 is placed within hole 86 of handle 16 with flange 72 and engaging members 74 within intermediate portion 90 of hole 86 and such that cylindrical body 60 extends upwardly through top portion 88 (see FIG. 7) of hole 86. Spring 18 is seated on top surface 40 of flange 36 on stem adapter 12. Stem adapter 12 is then placed within hole 86 of handle 16 such that top surface 40 of flange 36 on stem adapter 12 abuts annular surface 100 of handle 16, and such that protrusion 42 extends upwardly and mates with aperture 66 of torque isolator 14. Washer 110 is seated on bottom surface 38 of flange 36, and snap ring 116 is placed within annular groove 102 so that top surface 118 of snap ring 116 abuts bottom surface 114 of washer 110.

Then, torque isolation system 10 is positioned so that bottom portion 30 of aperture 32 in stem adapter 12 (see FIG. 3) receives a stem 150. Stem 150 is then secured to stem adapter 12. Referring to FIGS. 3 and 5, if stem 150 includes an upwardly-facing threaded hole, a screw or bolt is placed downwardly through hole 71 in torque isolator 14 and into aperture 32 of stem adapter 12 so that the head of the bolt or screw is within top portion 28 of aperture 32, and the screw or bolt extends downwardly to engage the threaded hole in stem 150. The bolt or screw is then tightened using a tool, such as a screwdriver, that extends through hole 71 in torque isolator 14 (see FIG. 5) and into top portion 28 of aperture 32 in stem adapter 12. The head of the bolt or screw then engages annular surface 33 of stem adapter 12 and the threads of the bolt or screw engage the threads of the stem to secure stem adapter 12 to stem 150. Alternatively, if stem 150 is adapted to receive a transversely-extending screw or bolt, a screw or bolt is screwed through threaded hole 34 in stem adapter 12 using a tool that extends through hole 106 in handle 16 and into threaded hole 34 in stem adapter 12 so that the screw or bolt engages stem 150.

Alternatively, it may be desirable to first place washer 110 and snap ring 116 over stem 150, then to secure stem adapter 12 to stem 150 as described above. Next, spring 18 is seated on stem adapter 12, and torque isolator 14 is seated within handle 16. Finally, handle 16 is placed over stem adapter 12 so that protrusion 42 on stem adapter 12 mates with aperture 66 in torque isolator 14, and snap ring 116 is seated within annular groove 102 in handle 16. This may be desirable if stem 150 does not have an upwardly-facing threaded hole and threaded hole 34 is difficult to access.

The method of using torque isolation system 10 will now be described with reference to FIGS. 10–12. Referring to FIG. 10, torque isolator 14 is in the coupled position, wherein torque isolator 14 transmits either of two possible directions of torque from handle 16 to stem 150. In the embodiment shown, handle 16 is coupled to torque isolator 14, torque isolator 14 is coupled to stem adapter 12, and stem adapter 12 is coupled to stem 150.

To isolate handle 16 from stem 150, torque isolator 14 is depressed so that it slides axially from the coupled position shown in FIG. 10, where top surface 62 of torque isolator 14 is a distance D3 from top surface 82 of handle 16 to the decoupled position shown in FIG. 11, where top surface 62 of torque isolator 14 is a distance D1 from top surface 82 of handle 16. In the coupled position of FIG. 10, engaging members 74 of torque isolator 14 interlock with engaging members 96 of handle 16 to transmit torque from handle 16 to torque isolator 14. However, in the decoupled position of FIG. 11, engaging members 74 of torque isolator 14 do not interlock with engaging members 96 of handle 16, so that torque isolator 14 does not transmit torque from handle 16 to stem adapter 12, and thus does not transmit torque from handle 16 to stem 150.

After torque isolator 14 has been depressed to the decoupled position, lock 20 is slid so that engaging member 140 slides into annular groove 104 and plate 130 extends over top surface 82 of handle 16 and abuts top surface 62 of torque isolator 14, as shown in FIG. 11. For the decoupled position, lock 20 is sized to allow spring 18 to bias torque isolator upwardly so that top surface 62 of torque isolator 14 is a distance D1 from top surface 82 of handle 16. Padlock 138 may then be secured to lock 20 through hole 136. When padlock 138 is secured to lock 20, lock 20 cannot slide out of engagement with handle 16, and thus torque isolator 14 is secured in the decoupled position. Such a configuration provides particularly good results with lockout-tagout procedures because each user may have an individualized padlock 138 so that other users cannot move torque isolator 14 from the decoupled position to the coupled position because they do not have the key or combination to that particular padlock 138.

Torque isolator 14 may also be moved from the coupled position shown in FIG. 10 to the ratchet position shown in FIG. 12. This is done by using a lock 20 that is sized to allow spring 18 to bias torque isolator 14 upwardly so that top surface 62 of torque isolator 14 is a distance D2 from top surface 82 of handle 16. In the ratchet position, torque isolator 14 does not transmit first direction T1 of torque from handle 16 to stem 150, but torque isolator 14 does transmit second direction T2 of torque from handle 16 to stem 150.

The lock may alternatively include an engaging member that extends downwardly and inwardly as engaging member 140 and another engaging member that extends upwardly and inwardly, wherein one of the engaging members is sized to allow spring 18 to bias torque isolator 14 upwardly so that top surface 62 of torque isolator 14 is a distance D2 from top surface 82 of handle 16, and the other engaging member is sized to allow spring 18 to bias torque isolator 14 upwardly so that top surface 62 of torque isolator 14 is a distance D1 from top surface 82 of handle 16. Such a lock can be used to lock torque isolator 14 in the decoupled position or the ratchet position, depending on which engaging member engages annular groove 104.

In the ratchet position shown in FIG. 12, engaging members 74 of torque isolator 14 interlock with engaging members 96 of handle 16 if handle 16 is rotated in second direction T2, so that torque isolator 14 transmits torque from handle 16 to stem adapter 12, and thus transmits torque from handle 16 to stem 150. However, if handle 16 is rotated in first direction T1, sloped surface 98 of each engaging member 96 on handle 14 abuts an engaging member 74 of torque isolator 14, thereby forcing engaging members 74 downwardly and out of engagement with engaging members 96. Alternatively, surfaces 74 may extend in a spiral direction, and surfaces 98 may extend horizontally. Although some torque will be transferred because of friction between engaging members 74 and engaging members 96, such torque will be minimal, and the system may be designed such that the torque is insufficient to rotate stem 150. Thus, torque isolator 14 is decoupled from handle 16 if handle 16 is rotated in first direction T1, but torque isolator 14 is coupled to handle 16 if handle 16 is rotated in second direction T2. The ratchet position is particularly useful if it is desirable to allow a regulator to be actuated in one direction, but not the other, such as if it is desirable to have a partially-opened valve be locked so that it cannot be opened farther, but it can be closed in an emergency.

To move torque isolator 14 from the ratchet position or the decoupled position to the coupled position, padlock 138 is removed from lock 20. Then, lock 20 is slid out of engagement with handle 16, allowing spring 18 to bias torque isolator 14 back into the coupled position.

Alternatively, the torque isolator can be moveable between a coupled position wherein the torque isolator is coupled to the handle and the regulator stem, and a decoupled position wherein the torque isolator is decoupled from both the regulator stem and the handle or is decoupled from the regulator stem but is still coupled to the handle.

In summary, the system of the present invention includes a torque isolator moveable between a first position, wherein the torque isolator transmits either of two possible directions of torque from a handle to a rotatable regulator stem, and a second position, wherein the torque isolator transmits only one or neither of the two possible directions of torque from the handle to the regulator stem, and a lock securing the torque isolator in a selected position. The system may be formed by a variety of structures that are different than the particular structures described herein. For example, the system may include various types of interlocking members that are different than those particularly described herein. Moreover, the biasing member may be any of various types of biasing members, such as tension springs, elastomeric biasing members, and biasing members that use gravity to produce a biasing force. In the embodiments described herein the handle covers the inner structure to deter tampering; although this configuration is preferred, it is not required for the present invention.

While the invention has been particularly shown and described with reference to preferred embodiments thereof, it will be understood by those skilled in the art that various changes in form and details may be made therein without departing from the spirit and scope of the invention. For example, the slide lock can include an integrated key lock, rather than a hole for receiving a padlock, so that each user has an individualized slide lock. Because no other users have the key to that particular slide lock, as with the previous embodiments, other users cannot move the torque isolator from the selected position to another position.

What is claimed is:

1. A torque isolation system for isolating a handle from a rotatable stem, comprising:
    a handle;
    a torque isolator moveable between a coupled position wherein the torque isolator is coupled to the handle, a decoupled position wherein the torque isolator is decoupled from the handle, and a ratchet position wherein the torque isolator is decoupled from the handle if the handle is rotated in a first direction, but the torque isolator is coupled to the handle if the handle is rotated in a second direction;
    a stem adapter coupled to the torque isolator, the stem adapter adapted to transmit either of two possible directions of torque from the torque isolator to a valve stem;
    a bias member biasing the torque isolator into the coupled position; and
    a lock opposing the biasing of the bias member;
    wherein the handle defines an axially extending hole, wherein the torque isolator extends axially through the hole and a top surface of the torque isolator faces away from the handle, wherein the top surface of the torque isolator is a distance D1 from a top surface of the handle when the torque isolator is in the decoupled position, wherein the top surface of the torque isolator is a distance D2 from the top surface of the handle when the torque isolator is in the ratchet position, and wherein the top surface of the torque isolator is a distance D3 from the top surface of the handle when the torque isolator is in the coupled position.

2. The system of claim 1, wherein the stem adapter is rotatably connected to the handle.

3. The system of claim 2, wherein the bias member biases the torque isolator relative to the stem adapter.

4. The system of claim 3, wherein the bias member is a compression spring.

5. The system of claim 1, wherein D2 is greater than D1 and D3 is greater than D2.

6. The system of claim 1, wherein the lock includes an engaging surface and an abutting surface, such that the engaging surface engages the handle and the abutting surface abuts the top surface of the torque isolator to oppose the biasing of the bias member.

7. The system of claim 6, wherein the handle defines an annular groove and the engaging surface of the lock is formed on a protrusion that fits within the annular groove.

8. A torque isolation system for isolating a handle from a rotatable stem, comprising:

a handle;

a torque isolator moveable between a coupled position wherein the torque isolator is coupled to the handle, a decoupled position wherein the torque isolator is decoupled from the handle, and a ratchet position wherein the torque isolator is decoupled from the handle if the handle is rotated in a first direction, but the torque isolator is coupled to the handle if the handle is rotated in a second direction;

a stem adapter coupled to the torque isolator, the stem adapter adapted to transmit either of two possible directions of torque from the torque isolator to a valve stem;

a bias member biasing the torque isolator into the coupled position; and a lock opposing the biasing of the bias member;

wherein the handle includes circumferentially spaced engaging elements and the torque isolator includes circumferentially spaced engaging elements, such that when the torque isolator is in the coupled position the circumferentially spaced engaging elements of the handle interlock with the circumferentially spaced engaging elements of the torque isolator; such that when the torque isolator is in the decoupled position the circumferentially spaced engaging elements of the handle do not interlock with the circumferentially spaced engaging elements of the torque isolator; and such that when the torque isolator is in the ratchet position the circumferentially spaced engaging elements of the handle do not interlock with the circumferentially spaced engaging elements of the torque isolator when the handle is rotated in the first direction, but the circumferentially spaced engaging elements of the handle do interlock with the circumferentially spaced engaging elements of the torque isolator when the handle is rotated in the second direction.

* * * * *